United States Patent [19]

Matsui et al.

[11] 4,289,377
[45] Sep. 15, 1981

[54] PROJECTING APPARATUS

[75] Inventors: Yoshiya Matsui; Setsuo Minami; Noritaka Mochizuki, all of Yokohama, Japan

[73] Assignee: Canon Kabushiki Kaisha, Tokyo, Japan

[21] Appl. No.: 23,268

[22] Filed: Mar. 23, 1979

[30] Foreign Application Priority Data

Apr. 5, 1978 [JP] Japan .................................. 53-40053

[51] Int. Cl.³ ...................... G03B 27/48; G02B 27/10; G02B 27/28
[52] U.S. Cl. ........................................ 350/169; 353/38; 353/99; 355/51; 350/167
[58] Field of Search ............... 353/20, 38, 99; 355/51, 355/52; 350/167, 169

[56] References Cited

U.S. PATENT DOCUMENTS

| | | | |
|---|---|---|---|
| 2,958,258 | 11/1960 | Kelly | 353/20 |
| 3,580,675 | 5/1971 | Hieber et al. | 355/51 |
| 3,584,952 | 6/1971 | Gundlach et al. | 355/52 |
| 3,836,249 | 9/1974 | Weber | 355/51 |

Primary Examiner—Steven L. Stephan
Attorney, Agent, or Firm—Fitzpatrick, Cella, Harper & Scinto

[57] ABSTRACT

In a projecting apparatus which focuses the image of an object on an intermediate mirror through a lens array and finally projects the reflected image onto a projection plane again through said lens array, a polarizing beam splitter is provided between the object plane and the lens array to reduce the light loss and to compactize the apparatus.

4 Claims, 2 Drawing Figures

PROJECTING APPARATUS

BACKGROUND OF THE INVENTION

1. Field of the Invention

The present invention relates to a projecting apparatus, and more particularly to a projecting apparatus for forming the mirror image of an object on a projection plane.

2. Description of the Prior Art

A projecting apparatus forming the mirror image of an object has been employed, for example, copying apparatus involving an image transfer step.

In a conventional copier the projecting apparatus is composed of a single projecting lens system, but such copier is inevitably large because of the relatively large conjugate length of such projecting lens system. In order to overcome this drawback there has been proposed a projecting apparatus having a plurality of lens systems of a relatively small conjugate length, wherein each of said lens systems shares a portion of the object to be projected, whereby said lens systems in combination function to project the entire image of said object onto a projection plane. For example United States Patent 3,584,952 discloses a projecting apparatus having a plurality of lens systems arranged along a strip-shaped area of an original to be copied, wherein each of said lens systems is adapted to project a partial image of systems being adapted to form a partial image of said strip-shaped area onto a photosensitive member. The copying apparatus can be rendered relatively compact by the use of such projecting apparatus.

Also, British Patent Specification No. 1462085 discloses a projecting apparatus which focuses the image of an object on a mirror through an array lens system and guides the light reflected by said mirror toward a refocusing plane again through said array lens system and by a half mirror positioned between the object and said array lens system, thereby forming the mirror image of said object on said focusing plane. This apparatus is however disadvantageous due to the increased loss of light resulting from the use of said half mirror.

SUMMARY OF THE INVENTION

The object of the present invention is to provide a compact projecting apparatus with a reduced light loss. The above-mentioned object is achieved according to the present invention by a lens array, a mirror provided substantially on the image plane of said lens array, a polarizing beam splitter positioned oblique to the optical axis of said lens array, and optical means positioned between said lens array and said mirror and adapted to change the polarizing direction of the light by 90°.

DESCRIPTION OF THE PREFERRED EMBODIMENTS

In the following there will be given a detailed explanation on the present invention while making reference to the attached drawings.

Figure 1:
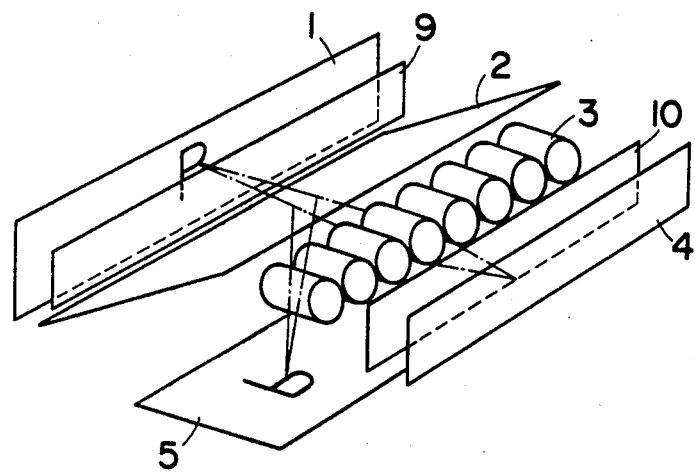
FIG. 1 is a perspective view of the apparatus embodying the present invention.

In FIG. 1 there are shown an object 1, a polarizing beam splitter 2 positioned at an angle of 45° with respect to the optical axis, a plurality of rod-shaped lenses (hereinafter called bar lenses) 3 arranged in a one-dimensional array along the longitudinal direction of said object and each having an axial length considerably larger than the effective diameter thereof, a mirror 4 provided at a position conjugate or substantially conjugate to said object 1 with respect to said lenses 3, a projection plane 5, a polarizer 9 having a polarizing direction coinciding with that of said polarizing beam splitter 2, and a ¼-wavelength plate 10. The image of a letter P, having a dimension of coverage of a single bar lens 3, if formed by said lens 3 on or in the vicinity of said mirror 4, and the image-forming beam, upon reflection by said mirror 4, is guided again through said lens 3 and deflected by said polarizing beam splitter 2 toward the projection plane 5, thereby forming a mirror image of the letter P thereon.

The light from the object 1 becomes linearly polarized by the polarizer 9 in a direction identical with the polarizing direction thereof. Thus, if the light from the object 1 is circularly polarized, the amount of light transmitted by the polarizer 9 is reduced to half as will be apparent from the integration of the cosine component of said circularly polarized light.

The linearly polarized light transmitted by said polarizer 9 passes, in succession, the polarizing beam splitter 2 having the same polarizing direction, the bar lens 3 and the ¼-wavelength plate 10. Said ¼-wavelength 10 is positioned so as to form an angle of 45° with respect to the polarizing direction of said polarizer, and converts the linearly polarized light into circularly polarized light. The light beam focused on said mirror 4 and reflected thereby again passes said ¼-wavelength plate 10, whereby said light is converted again into a linearly polarized light of a polarized direction perpendicular to that of the afore-mentioned linearly polarized light and totally reflected, by the polarizing beam splitter 2 toward the projection plane 5.

As explained in the foregoing, when the light from the object 1 is circularly polarized, a half of said light can be transmitted to the projection plane 5. This amount of light is twice as much in comparison with the case of conventional projection systems utilizing an ordinary half mirror wherein only a quarter of the light emergent from the object can be transmitted to the projection plane.

It will also be understood that said polarizer 9 can be dispensed with if the light from the object is linearly polarized in a direction the same as the polarizing direction of the polarizing beam splitter 2.

Figure 2:
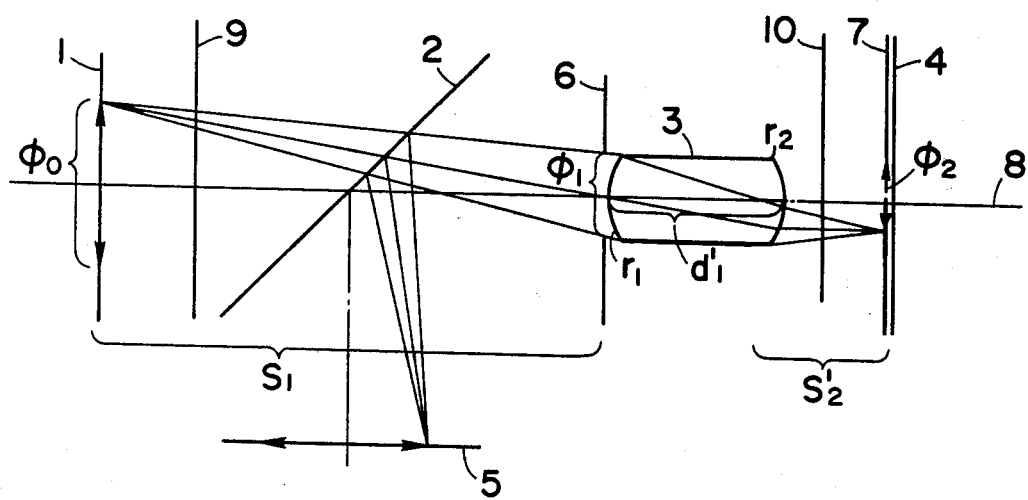
FIG. 2 is a view showing the light path in the apparatus shown in FIG. 1.

Now there will be given an explanation on FIG. 2 showing the light path in the apparatus shown in FIG. 1, wherein 6 is a diaphragm defining the amount of light, 7 is another diaphragm defining the image field, and 8 is the optical axis.

Each of the bar lenses 3 is provided with an axial length corresponding to 2 to 60 times the effective diameter thereof, and is preferably designed to satisfy the conditions (6) to (10) to be explained later.

In FIG. 2, various parameters are defined as follows:

$\gamma_1$: radius of curvature of the first face, facing the object, of the bar lens;

$\gamma_2$: radius of curvature (taken as negative in FIG. 2) of the second face, at the image field side, of said bar lens;

$d'_1$: axial thickness, or the distance between the first and second faces, of said bar lens;

$n'_1$: principal refractive index, i.e. the refractive index for the design wavelength, of the material constituting said bar lens;

$\phi_1$: effective diameter of said bar lens;

$\phi_0$: dimension of the object P;

$\phi_2$: dimension of the intermediate image formed by said bar lens;

$S_1$: distance from the first face of the bar lens 3 to the object P (regarded as negative in FIG. 2);

$S'_2$: distance from the second face of the bar lens 3 to the intermediate image;

$\beta_1$: lateral magnification of the intermediate image with respect to the object P ($\equiv -|\phi_2/\phi_1|$); and Fe: effective F number at the object side of said bar lens 3.

Among these parameters it is possible to determine in advance the effective F number which can be defined from the illuminating condition as follows:

$$Fe = \sqrt{S_1^2 + (\phi_1/2)^2} / \phi_1 \quad (1)$$

the lateral magnification $\beta_1$ of the intermediate image to be determined to avoid shielding of the partial image ($|\beta_1|<1$), the distance $S_1$ to the object and the lensback distance $S'_2$ to the intermediate image. Also the principal refractive index $n'_1$ of the lens can be determined by the selection of the material constituting the same. The radius of curvature $\gamma_1$ of the first face of said bar lens, the radius of curvature $\gamma_2$ of the second face thereof, the axial thickness $b'_1$ of the lens, the effective diameter $\phi_1$ of the said lens and the partial effective diameter $\phi_0$ of the object can be determined in the following manner from the ideal imaging theory, utilizing the above-mentioned five parameters Fe, $\beta_1$, $S_1$, $S'_2$ and $n'_1$.

The lateral magnification $\beta_1$ is given by the following equation:

$$\beta_1 = \frac{1}{\{\phi_1 + \phi_2 - \phi_1 \cdot e'_1 \cdot \phi_2\}S_1 + \{1 - e'_1 \cdot \phi_2\}} \quad (2)$$

wherein:

$\phi_1 \equiv (n'_1 - 1)/\gamma_1$ (refractive force of first face)
$\phi_2 \equiv (1 - n'_1)/\gamma_2$ (refractive force of second face)
$\phi'_1 \equiv d'_1/n'_1$.

Then, the condition that the principal incident ray from the object passing through the center of the first face emerges from the second face parallel to the optical axis is equivalent to a condition that the focal length of the second face ($1/\phi_2$) is equal to $e'_1$:

$$1/\phi_2 = e'_1 \quad (3)$$

Also in order that the ray emerging from the peripheral portion of the effective diameter of the object $\phi_0$ is not shielded by the lens 3, the peripheral portion of the light beam has to proceed, after passing the first face of the lens 3, along the lens edge parallel to the optical axis. Thus:

$$1 = -1/S_1\{1 + \phi_0/\phi_1\} \quad (4)$$

Finally in order to obtain an appropriate distance $S'_2$ from the second face of the lens 3 to the intermediate image position, there is required the following condition:

$$S'_2 = \beta_1 \times \{(1 - \phi_1 \cdot e'_1)S_1 - e'_1\} \quad (5)$$

By solving the foregoing equation (1) to (5) it is possible to determine the parameters $\gamma_1$, $\gamma_2$, $d'_1$, $\phi_1$ and $\phi_0$ in a unitary manner as follows:

$$\gamma_1 = (n'_1 - 1) \times \frac{\beta_1 S_1}{\left[(1 - \beta_1) - \frac{S'_2}{\beta_1 S_1}\right]} \quad (6)$$

$$\gamma_2 = (1 - n'_1) \times \beta_1 S_1 \quad (7)$$

$$d'_1 = n'_1 \times \beta_1 S_1 \quad (8)$$

$$\phi_1 = \frac{-S_1/Fe}{\sqrt{1 - \left(\frac{1}{2Fe}\right)^2}} \quad (9)$$

$$\phi_0 = \left(\frac{\left(\frac{S'_2}{\beta_1}\right) - S_1}{\beta_1 S_1}\right) \times \phi_1 \quad (10)$$

Also the present inventors have confirmed from the actual designing that the above-mentioned conditions for the lens 3 may vary within an extent of approximately ±10%. Stated differently the acceptable ranges for the above-mentioned conditions may be expressed as follows:

$$K_1 \times (n'_1 - 1) \times \frac{\beta_1 S_1}{\left[(1 - \beta_1) - \frac{S_2}{\beta_1 S_1}\right]} \leq \gamma_1 \leq K_2 \times$$

$$(n'_1 - 1) \times \frac{\beta_1 S_1}{\left[(1 - \beta_1) - \frac{S'_2}{\beta_1 S_1}\right]}$$

$$K_1 \times (1 - n'_1) \times \beta_1 S_1 \geq \gamma_2 \geq K_2 \times (1 - n'_1) \times \beta_1 S_1$$

$$K_1 \times n'_1 \times \beta_1 S_1 \leq d_{1'} \leq K_2 \times n'_1 \times \beta_1 S_1$$

$$K_1 \times \frac{-S_1/Fe}{1 - \left(\frac{1}{2Fe}\right)^2} \leq \phi_1 \leq K_2 \times \frac{-S_1/Fe}{1 - \left(\frac{1}{2Fe}\right)^2}$$

$$K_1 \times \left[\frac{\left(\frac{S'_2}{\beta_1}\right) - S_1}{\beta_1 S_1}\right] \times \phi_1 \leq \phi_2 \leq K_2 \times$$

$$\left[\frac{\left(\frac{S'_2}{\beta_1}\right) - S_1}{\beta_1 S_1}\right] \times \phi_1$$

wherein $K_1 = 0.9$ and $K_2 = 1.1$.

The following Table 1 shows an example of the data of said lens:

TABLE 1

| | |
|---|---|
| $\phi_0$ | 2.6 |
| $\phi_1$ | 2.8 |
| $S'_2$ | 3.5 |
| $S_1$ | −2.5 |
| $\beta_1$ | −0.513 |
| $n'_1$ | 1.51633 |
| material | BK7 |
| $\gamma_1$ | 5.443 |
| $\gamma_2$ | −6.499 |

TABLE 1-continued

| $d_1'$ | 19.67 |
|---|---|

As explained in the foregoing it is possible according to the present invention to obtain a compact projecting apparatus with a reduced loss of light.

What we claim is:

1. A projecting apparatus comprising:
   an array of rod-shaped lenses for forming the image of an object, each of said lenses having only two lens surfaces and an axial length larger than the effective diameter thereof;
   a plane mirror positioned in the vicinity of the intermediate image plane of said array of rod-shaped lenses, wherein the principal ray of light rays incident on said mirror is traced by the principal ray of light rays reflected by said plane mirror;
   a polarizing beam splitter positioned obliquely to the optical axis of said lens array and being disposed between the object and the lens array; and
   optical means for changing the polarizing direction of the light to a direction perpendicular thereto.

2. A projecting apparatus according to the claim 1, wherein said optical means comprising a polarizer and a ¼-wavelength plate.

3. A projecting apparatus according to the claim 1, wherein the axial length of each rod-shaped lens is within a range of 2 to 60 times of the effective diameter thereof.

4. A projecting apparatus according to claim 1, wherein each rod-shaped lens satisfies the following characteristics:

$$K_1 \times (n_1' - 1) \times \frac{\beta_1 S_1}{\left[(1 - \beta_1) - \frac{S_2}{\beta_1 S_1}\right]} \leq r_1 \leq K_2 \times$$

$$(n_1' - 1) \times \frac{\beta_1 S_1}{\left[(1 - \beta_1) - \frac{S_2'}{\beta_1 S_1}\right]}$$

$$K_1 \times (1 - n_2') \times \beta_1 S_1 \geq r_2 \geq K_2 \times (1 - n_1') \beta_1 S_1$$

$$K_1 \times n_1' \times \beta_1 S_1 \leq d_1' \leq K_2 \times n_1' \times \beta_1 S_1$$

$$K_1 \times \frac{-S_1/Fe}{1 - \left(\frac{1}{2Fe}\right)^2} \leq \phi_1 \leq K_2 \times \frac{-S_1/Fe}{1 - \left(\frac{1}{2Fe}\right)^2}$$

$$K_1 \times \frac{\left(\frac{S_2'}{\beta_1}\right) - S_1}{\beta_1 S_1} \times \phi_1 \leq \phi_2 \leq K_2 \times \frac{\left(\frac{S_2'}{\beta_1}\right) - S_1}{\beta_1 S_1} \times \phi_1$$

wherein
$K_1 = 0.9$ and $K_2 = 1.1$
$r_1$: radius of curvature of the first face, facing the object, of the rod-shaped lens;
$r_2$: radius of curvature of the second face, at the image field side, of said rod-shaped lens;
$d_1'$: axial thickness, or the distance between the first and second faces of said rod-shaped lens;
$n_1'$: principal refractive index, i.e. the refractive index for the design wavelength, of the material constituting said rod-shaped lens;
$\phi_1$: effective diameter of said rod-shaped lens;
$\phi_0$: dimension of the object;
$\phi_2$: dimension of the intermediate image formed by said rod-shaped lens;
$S_1$: distance from the first fact of the rod-shaped lens to the object;
$S'_2$: distance from the second face of the rod-shaped lens to the intermediate image;
$\beta_1$: lateral magnification of the intermediate image with respect to the object ($\equiv -|\phi_2/\phi_1|$); and
Fe: effective F number at the object side of said rod-shaped lens.

* * * * *

UNITED STATES PATENT AND TRADEMARK OFFICE
CERTIFICATE OF CORRECTION

PATENT NO. : 4,289,377
DATED : September 15, 1981
INVENTOR(S) : YOSHIYA MATSUI, ET AL.

It is certified that error appears in the above—identified patent and that said Letters Patent are hereby corrected as shown below:

Column 1

Line 12, before "copying" insert --in--.

Column 3

Lines 42, 44, 45, 46, 51 and 53, change "$\phi$" to --$\zeta$--.

Column 4

Line 1, change "$\phi$" to --$\zeta$--.

Signed and Sealed this

Sixteenth Day of February 1982

[SEAL]

Attest:

GERALD J. MOSSINGHOFF

*Attesting Officer*  *Commissioner of Patents and Trademarks*